US012567286B2

(12) United States Patent
Tseng et al.

(10) Patent No.: US 12,567,286 B2
(45) Date of Patent: Mar. 3, 2026

(54) SYSTEMS AND METHODS FOR DETECTING VEHICLE CHARGING BEHAVIOR

(71) Applicant: Ford Global Technologies, LLC, Dearborn, MI (US)

(72) Inventors: Fling Finn Tseng, Ann Arbor, MI (US); Bhagyashri Satyabodha Katti, Novi, MI (US); Swati Rawat, Brampton (CA); Kalyani Purushottam Sonawane, Plymouth, MI (US); Kwaku O. Prakah-Asante, Commerce Township, MI (US)

( * ) Notice: Subject to any disclaimer, the term of this patent is extended or adjusted under 35 U.S.C. 154(b) by 205 days.

(21) Appl. No.: 18/487,102

(22) Filed: Oct. 15, 2023

(65) Prior Publication Data

US 2025/0124744 A1 Apr. 17, 2025

(51) Int. Cl.
| | |
|---|---|
| B60L 53/14 | (2019.01) |
| G01C 21/34 | (2006.01) |
| G01C 21/36 | (2006.01) |
| G07C 5/00 | (2006.01) |

(52) U.S. Cl.
CPC .............. G07C 5/004 (2013.01); B60L 53/14 (2019.02); G01C 21/3469 (2013.01); G01C 21/3691 (2013.01); B60L 2240/66 (2013.01)

(58) Field of Classification Search
CPC ..... G07C 5/004; B60L 53/14; B60L 2240/66; G01C 21/3469; G01C 21/3691
See application file for complete search history.

(56) References Cited

U.S. PATENT DOCUMENTS

| | | | | |
|---|---|---|---|---|
| 10,737,577 | B2 * | 8/2020 | Kapadia | ................ B60L 53/665 |
| 2018/0229617 | A1 * | 8/2018 | Hendrix | ................. B60L 53/60 |
| 2021/0110323 | A1 | 4/2021 | Munoz et al. | |

(Continued)

OTHER PUBLICATIONS

Lytx, Fleet Safety Technology: Anomaly Detection in Machine Learning, https://resources.lytx.com/blog/fleet-safety-technology-anomaly-detection-in-machine-learning, Jun. 8, 2023, pp. 1-4.

(Continued)

*Primary Examiner* — Scott A Browne
*Assistant Examiner* — Izcalli Rios-Aguirre
(74) *Attorney, Agent, or Firm* — Frank Lollo; Eversheds Sutherland (US) LLP

(57) ABSTRACT

A fleet management system including a transceiver and a processor is disclosed. The transceiver may be configured to receive a first charger location associated with a first charger, a second charger location associated with a second charger, and a current battery State of Charge (SoC) level associated with a vehicle. The processor may obtain the first charger location, the second charge location and the current battery SoC level from the transceiver responsive to obtaining a trigger signal. The processor may further determine a geo-distance between the first and second charger locations, and estimate an expected battery SoC level required by the vehicle to travel from the first charger location to the second charger location based on the geo-distance. The processor may compare the expected and current battery SoC levels, and output a notification when the current battery SoC level may be greater than the expected battery SoC level.

20 Claims, 6 Drawing Sheets

(56) References Cited

U.S. PATENT DOCUMENTS

| | | | |
|---|---|---|---|
| 2021/0213846 A1* | 7/2021 | Sun | B60L 58/12 |
| 2022/0410750 A1* | 12/2022 | Mangal | B60L 53/62 |

OTHER PUBLICATIONS

Pere Izquierdo Gomez, et al., Data-Driven Thermal Modelling for Anomaly Detection in Electric Vehicle Charging Stations, Department of Wind and Energy Systems, Technical University of Denmark, Jul. 12, 2022, pp. 1-6.

* cited by examiner

| Wk day | Avg. start SOC | Avg. SOC(-) usage | Avg. SOC(-) sigma | Avg.chg start SOC (ND) | Avg.SOC+ from non-depot | Overcharge soc (ND) | Loss of productivity (hr) | Score-overcharge indicator | Score-overcharge amount | Score-range anxiety | SOC usage > 100% |
|---|---|---|---|---|---|---|---|---|---|---|---|
| 0 | 100.0000 | 94.3000 | 30.1550 | 26.8000 | 37.4000 | 20.800000 | 0.346667 | 0.50 | 0.321035 | 0.4722 | 0.4000 |
| 1 | 100.0000 | 108.800 | 32.1842 | 31.8750 | 59.4000 | 35.900000 | 0.598333 | 0.40 | 0.547547 | 0.5665 | 0.6000 |
| 2 | 97.3333 | 60.3000 | 49.7182 | 31.9166 | 20.9166 | 28.000000 | 0.466667 | 0.75 | 1.190823 | 0.7316 | 0.1666 |
| 3 | 79.7142 | 84.7857 | 53.4718 | 15.6785 | 44.8571 | 20.000000 | 0.333333 | 0.20 | 0.237639 | 0.3271 | 0.5714 |
| 4 | 82.8571 | 61.9285 | 49.0088 | 20.7857 | 24.9285 | 13.714286 | 0.228571 | 0.50 | 0.227830 | 0.3767 | 0.2857 |
| 5 | NA | NA | 10.0000 | NA | NA | NA | NA | NA | NA | NA | NA |
| 6 | NA | NA | 10.1000 | NA | NA | NA | NA | NA | NA | NA | NA |

SYSTEMS AND METHODS FOR DETECTING VEHICLE CHARGING BEHAVIOR

FIELD

The present disclosure relates to systems and methods for detecting vehicle charging behavior based on charger location and overcharging pattern.

BACKGROUND

Fleet operators spend considerable time and resources to ensure that their vehicle fleet operates in an efficient manner with minimum downtime and uses an optimum amount of energy. For example, a fleet operator operating an electric vehicle (EV) fleet may train vehicle drivers to regularly charge the EVs at the depot, drive at an optimum speed, minimize break-time, etc. to ensure that the fleet operates in an efficient manner.

While driver training may be effective to some extent, not all fleet drivers operate their vehicles in the same manner even after the training. Fleet operational efficiency may get affected if one or more drivers do not follow fleet operator's instructions.

Therefore, a system is required that may facilitate a fleet operator to operate a vehicle fleet efficiently.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 4 depicts an example summary table of vehicle charging behavior in accordance with the present disclosure.

DETAILED DESCRIPTION

Overview

Figure 1:
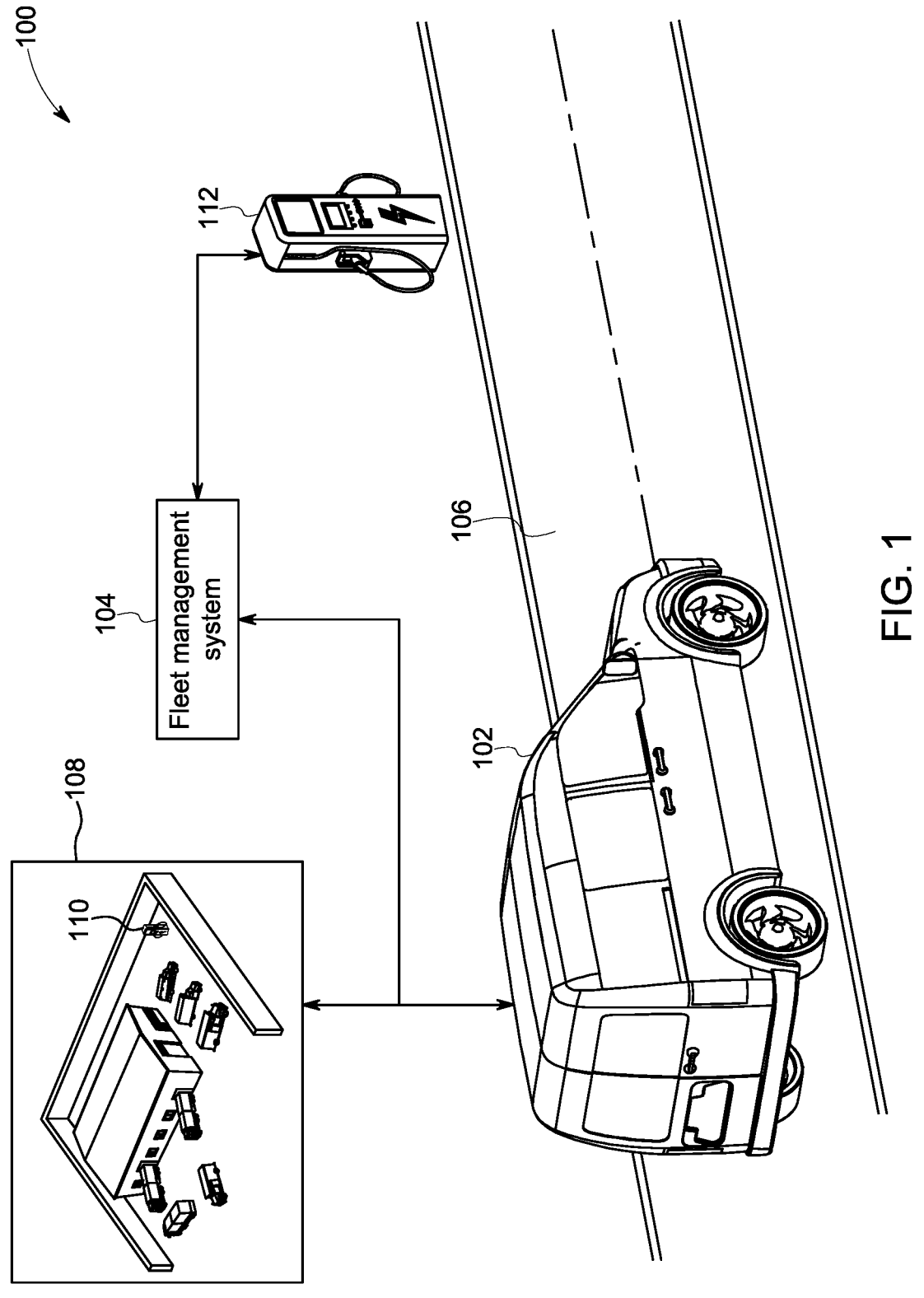
FIG. 1 depicts an example environment in which techniques and structures for providing the systems and methods disclosed herein may be implemented.

The present disclosure describes a fleet management system that may facilitate a fleet operator and/or a plurality of vehicle fleet drivers in enhancing fleet operational efficiency and vehicle charging behavior. The system may be configured to obtain charging information associated with each fleet vehicle (which may Electric Vehicles (EVs)), and generate vehicle-level and fleet-level summaries of charging behavior. Examples of the charging information include, but are not limited to, locations of chargers at which the fleet vehicles connect to charge (e.g., at a fleet depot or while travelling on respective delivery routes), an amount of resources (e.g., fees) charged by each charger for per-unit energy transferred to the vehicles, an amount of energy transferred to each vehicle while charging, real-time or current battery state of charge (SoC) level of each vehicle, typical time on each day when each vehicle charges at a depot charger, average historical SoC usage on respective delivery routes for each vehicle, and/or the like. Vehicle-level summaries may include indicators or scores associated with tendencies of vehicle drivers associated with each vehicle to overcharge respective vehicles, charge the vehicles when not necessary, charge at charging stations/chargers that may not be preferred by the fleet operator, and/or the like.

The fleet operator may use the vehicle-level and fleet-level summaries to identify one or more vehicle drivers who may require training and/or intervention to enhance their vehicle charging behaviors. The fleet operator may additionally use the vehicle-level and fleet-level summaries to identify one or more fleet vehicles that may be over-utilized, or vehicles that may require battery upgrade or replacement, and/or vehicles that may require power banks.

In addition to generating the vehicle-level and fleet-level summaries, the system may be configured to provide real-time alert notifications to a vehicle driver and/or the fleet operator when the vehicle driver may exhibit sub-optimal vehicle charging behavior. For example, the system may output a first notification to a fleet operator computing device, a user device associated with the vehicle driver and/or a vehicle Human-Machine Interface (HMI) when the vehicle driver may be charging at a charger that may not be a preferred charger for the vehicle fleet (i.e., a non-preferred charger). In this case, when the vehicle driver connects the vehicle to the non-preferred charger, the system may receive a trigger signal from the vehicle. Responsive to receiving the trigger signal, the system may determine whether the current vehicle battery SoC level would enable the vehicle to travel to a nearest "preferred charger", without charging at the non-preferred charger. The system may output the first notification when the system determines that the current vehicle battery SoC level would enable the vehicle to travel to the nearest preferred charger.

The system may be further configured to output a second notification when the system determines that the vehicle driver may be overcharging the vehicle. In this case, when the vehicle driver may be charging the vehicle, the system may determine an amount of energy that may be transferred into the vehicle during charging, and an initial vehicle battery SoC level when the vehicle may have left the depot for travelling on the delivery route. The system may then compare a sum of the amount of transferred energy and the initial vehicle battery SoC level, with the average historical SoC usage associated with the vehicle on the delivery route. The system may output the second notification when a difference between the sum and the average historical SoC usage may be greater than a predefined threshold.

The system may further output a third notification when the system determines that the vehicle driver may be charging the vehicle during off-hours (e.g., on weekends) or when the vehicle may not be typically charged. The system may additionally output a fourth notification when the system determines that the vehicle driver may be charging the vehicle when vehicle charging may not be required/necessary. For example, when the initial vehicle battery SoC level may be greater than the historical SoC usage on the delivery route (by more than a predefined SoC threshold) and the vehicle driver still charges the vehicle, the system may output the fourth notification indicating that the vehicle driver may be charging the vehicle when the vehicle charging may not be required/necessary.

The present disclosure discloses a fleet management system that prevents a vehicle driver from overcharging a vehicle and/or charging the vehicle when it may not be necessary, thereby conserving energy and enhancing fleet operational efficiency. Further, the system provides real-time notifications to the vehicle driver and/or the fleet operator so that remedial actions may be taken in a timely manner. Furthermore, the system generates vehicle-level and fleet-level summaries that enable the fleet operator to identify one or more vehicle drivers who may have training needs and/or one or more fleet vehicles that may require upgrade, replacements and/or power banks.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102 and a fleet management system 104 (system 104) that may be communicatively coupled with each other. The vehicle 102 may take the form of any passenger or commercial vehicle such as, for example, a car, a work vehicle, a crossover vehicle, a truck, a van, a minivan, a taxi, a bus, etc. In an exemplary aspect, the vehicle 102 may be a commercial delivery vehicle that may be part of a delivery vehicle fleet. The vehicle 102 may be a manually driven vehicle, and/or may be configured to operate in a partially or fully autonomous mode.

In some aspects, the vehicle 102 may be an electric vehicle (EV), and may be travelling on a road 106. In further aspects, the vehicle 102 may be associated with a fleet depot 108 (depot 108) that may include one or more first EV chargers 110 (or a first charger 110). The depot 108 may be a location from where the vehicle 102 may commence travel on vehicle's daily delivery route (e.g., at a start of vehicle's shift timing) and return at the end of the delivery route (e.g., at an end of vehicle's shift timing). In some aspects, a vehicle operator (not shown) or a fleet operator (not shown) may charge the vehicle 102 at the depot 108 by using the first charger 110.

The system 104 may be hosted on a server (e.g., a fleet management server) and may be configured to obtain charging information associated with a plurality of fleet vehicles (including the vehicle 102) that may be part of the vehicle fleet from a depot/fleet computing device (not shown) associated with the depot 108, one or more servers, one or more chargers, and/or directly from the vehicles. Examples of the charging information include, but are not limited to, locations of chargers at which the vehicles connect to charge (e.g., at the depot 108 or while on respective delivery routes), an amount of resources (e.g., fees) charged by each charger for per-unit energy transferred to the vehicles, an amount of energy transferred to each vehicle while charging, real-time or current battery state of charge (SoC) level of each vehicle, predetermined or typical time on each day when each vehicle charges at the first charger 110, average historical SoC usage on respective delivery routes for each vehicle, and/or the like. Responsive to obtaining the charging information associated with each fleet vehicle, the system 104 may be configured to determine a plurality of charging indicators/scores associated with each vehicle based on the obtained charging information. The charging indicators/scores may be indicative of a charging behavior associated with each vehicle.

The system 104 may transmit the charging indicators/scores and the collated charging information (including per-vehicle information and aggregated information at a fleet level) to the fleet computing device or a fleet server (shown as server 204 in FIG. 2) operated by the fleet operator. The fleet operator may view the charging indicators/scores and the collated charging information to determine charging statistics associated with each vehicle, and determine one or more drivers associated with the vehicle fleet who may be over-charging the vehicles, connecting the vehicles to the chargers when charging may not be required, charging at locations associated with the chargers that may not be the "preferred chargers" for the vehicle fleet, and/or the like. The fleet operator may impart customized training to such drivers to enhance fleet's operational efficiency. The fleet operator may also use the charging indicators/scores and the collated charging information to determine if one or more fleet vehicles may require power banks and their respective size/capacity, or if one or more vehicles may require a battery upgrade based on their SoC usage and charging information, or if one or more vehicles may require to be replaced with new vehicles.

In some aspects, the system 104 may be further configured to transmit alert notifications to the fleet server, a vehicle Human-Machine Interface (HMI) (shown as HMI 214 in FIG. 2), and/or a user device (shown as user device 202 in FIG. 2) associated with a vehicle driver, when the system 104 determines that the vehicle driver may be overcharging, connecting the vehicle to a charger when charging may not be necessary, and/or charging at a charger location/station that may not be a preferred charger location/station for the vehicle fleet.

As an example, when the vehicle 102 may be travelling on a delivery route on the road 106, the system 104 may obtain a real-time battery SoC level associated with the vehicle 102. The system 104 may further determine a real-time vehicle geolocation and a distance remaining on the delivery route to the depot 108 (i.e., a distance remaining to be travelled by the vehicle 102 to reach to the depot 108). When the vehicle 102 stops and the vehicle driver connects the vehicle 102 to a second charger 112 that may be located on the delivery route, the system 104 may determine a connection between the second charger 112 and the vehicle 102 (e.g., by obtaining signals from a vehicle control unit associated with the vehicle 102). Responsive to determining that the vehicle 102 may be connected with the second charger 112, the system 104 may obtain a second charger location (via the server described above or by obtaining a real-time vehicle geolocation from the vehicle 102). The system 104 may further determine if the second charger 112 may be a preferred charger associated with the vehicle fleet, based on the second charger location. In this case, the system 104 may pre-store locations of a plurality of preferred chargers associated with the vehicle fleet. In some aspects, a preferred charger may be any charger on the vehicle delivery route that may be authorized by the fleet operator to charge the vehicle 102, or may be the first charger 110. For example, a preferred charger may be a charger that may have a tie-up/partnership with the fleet management firm operating the vehicle fleet described in the present disclosure. For the sake of simplicity, the preferred charger on the vehicle delivery route is also referred to as the first charger 110 in the present disclosure.

Responsive to determining that the second charger 112 is not a preferred charger, the system 104 may determine a geo-distance between respective locations of the first charger 110 and the second charger 112. The system may further obtain, via the server described above, weather condition information associated with a geographical area including the first and second chargers 110, 112, and road condition information associated with one or more roads (e.g., the road 106) connecting the first charger 110 and the second charger 112. The system may then estimate an expected battery SoC level that may be required by the vehicle 102 to travel from the location associated with the second charger 112 to the location associated with the first charger 110, based on the determined geo-location, the road condition information and the weather condition information.

The system 104 may further determine a real-time vehicle battery SoC level (that may be part of the charging information associated with the vehicle 102) when the vehicle 102 reaches to the location associated with the second charger 112 or when the vehicle driver connects the vehicle 102 with the second charger 112. Responsive to determining the real-time vehicle battery SoC level, the system 104 may compare the expected battery SoC level with the real-time vehicle battery SoC level to determine if the vehicle 102 can travel to the location associated with the first charger 110 without charging at the second charger 112. In some aspects, the system 104 may determine that the vehicle 102 can travel to the location associated with the first charger 110 without charging at the second charger 112 when the real-time vehicle battery SoC level may be greater than the expected battery SoC. Responsive to such determination, the system 104 may output an alert notification to the fleet server, the vehicle HMI and/or the user device, to indicate to the fleet operator and/or the vehicle driver that the vehicle 102 may be getting charged at a "non-preferred" charger when the vehicle 102 can conveniently travel to the first charger 110 (i.e., the preferred charger) and get charged.

In some aspects, the system 104 may also obtain respective amount of pre-unit resources (e.g., pre-unit fees or charges) associated with the first and second chargers 110, 112 that may be required to charge the vehicle 102. Responsive to obtaining the amount of pre-unit resources, the system 104 may compare the respective amounts of pre-unit resources, and output the alert notification to the fleet server, the vehicle HMI and/or the user device when the amount of resources associated with the second charger 112 may be greater than the amount of resources associated with the first charger 110.

On the other hand, responsive to determining that the second charger 112 may be the preferred charger or same as the first charger 110 (i.e., the vehicle 102 may be getting charged at the depot 108), the system 104 may determine a current day and time (e.g., from a system timer, not shown). The system 104 may further determine typical days and respective times when the vehicle 102 may get charged at the first charger 110 (that may be part of the charging information associated with the vehicle 102). The system 104 may then compare the determined typical days/times with the current day/time, and output the alert notification to the fleet server, the vehicle HMI and/or the user device when the current day/time may be different than the typical days/times. For example, if the information associated with the typical days/times indicate that the vehicle 102 does not get charged on Sundays (i.e., on weekends) at the first charger 110, and the vehicle driver connects the vehicle 102 to the first charger 110 on a Sunday, the system 104 may output the alert notification.

The different alert notifications described above may facilitate the fleet operator (and the vehicle driver) to determine abnormal or inefficient charging behavior in a timely manner and accordingly take remedial actions. The alert notifications may also be used by the fleet operator to effectively train the vehicle driver.

In some aspects, the system 104 may additionally output the alert notification when the system 104 determines that the vehicle driver may be overcharging the vehicle 102 (e.g., at the second charger 112 or at any of the preferred chargers on the delivery route) or connecting the vehicle 102 to the second charger 112 or any preferred charger when the charging may not be required/necessary. In this case, the system 104 may determine an initial battery SoC level when the vehicle 102 commences the travel on the delivery route from the depot 108 and the average historical (or expected) SoC usage on the delivery route for the vehicle 102, from the charging information associated with the vehicle 102. The system 104 may then compare the average historical SoC usage and the initial battery SoC level.

Responsive to determining that the initial battery SoC level may be greater than the average historical SoC usage, and a difference between the initial battery SoC level and the average historical SoC usage may be greater than a first predefined threshold (which may be, for example, 15-20% of the average historical SoC usage), the system 104 may output the alert notification to the fleet server, the vehicle HMI and/or the user device when the vehicle driver connects the vehicle 102 to any charger on the delivery route. In this case, the alert notification may indicate to the fleet operator and/or the vehicle driver that the vehicle driver may be charging the vehicle 102 when charging may not be required/necessary. In this manner, the system 104 may conserve energy and prevent unnecessary vehicle charging, and may also minimize loss of productive hours that the vehicle 102 may spend on unnecessary charging.

On the other hand, responsive to determining that the initial battery SoC level may be less than the average historical SoC usage, the system 104 may determine that the vehicle 102 may require charging on the delivery route. In this case, when the vehicle 102 may be connected to the second charger 112 or a preferred charger on the delivery route, the system 104 may determine an amount of energy transferred from the charger to the vehicle 102, via the charger or the vehicle 102. The system 104 may further compare the average historical SoC usage with a sum of the initial battery SoC level and the amount of energy transferred to the vehicle 102. If a difference between the sum and the average historical SoC usage may be greater than a second predefined threshold (which may be a predefined value pre-set by the fleet operator or 15-20% of the average historical SoC usage), the system 104 may output the alert notification to the fleet server, the vehicle HMI and/or the user device. In this case, the alert notification may indicate to the fleet operator and/or the vehicle driver that the vehicle driver may be overcharging the vehicle 102. The fleet operator may use this alert notification to train the vehicle driver and/or to instruct the vehicle driver to stop overcharging the vehicle 102.

Further details of the system 104 and the vehicle 102 are described below in conjunction with FIG. 2.

The vehicle 102, the system 104, the vehicle driver and the fleet operator implement and/or perform operations, as described here in the present disclosure, in accordance with the owner manual and safety guidelines. In addition, any action taken by the vehicle driver or the fleet operator should comply with all the rules specific to the location and operation of the vehicle 102 (e.g., Federal, state, country, city, etc.). The notifications or recommendations, as provided by the vehicle 102 or the system 104, should be treated as suggestions and only followed according to any rules specific to the location and operation of the vehicle 102.

Figure 2:
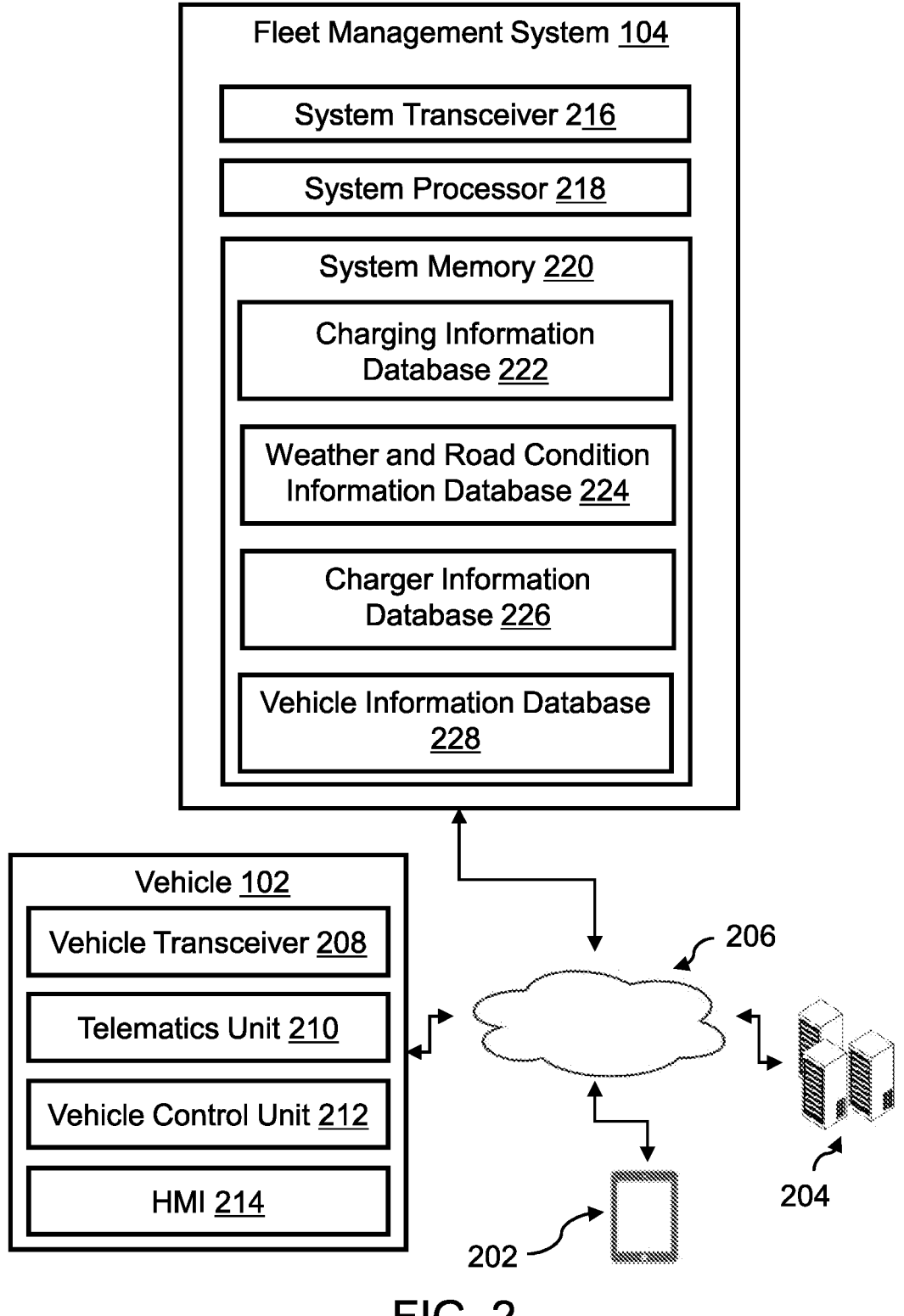
FIG. 2 depicts a block diagram of an example fleet management system in accordance with the present disclosure.

FIG. 2 depicts a block diagram of the fleet management system 104 (or system 104) in accordance with the present disclosure. While describing FIG. 2, references will be made to FIGS. 3, 4, 5A and 5B.

The system 104 may be communicatively coupled with a plurality of external systems/units including, but not limited to, a plurality of fleet vehicles (including the vehicle 102), a plurality of user devices (including a user device 202) associated with vehicle drivers of the plurality of fleet vehicles, and one or more servers 204 (or server 204) via one or more networks 206 (or network 206). The user device 202 may be, for example, a mobile phone, a laptop, a computer, a tablet, a wearable device, or any other device with communication capabilities.

The server 204 may be part of a cloud-based computing infrastructure and may be associated with and/or include a Telematics Service Delivery Network (SDN) that provides digital data services to the vehicle 102 and other vehicles (not shown in FIG. 2) that may be part of the vehicle fleet. In further aspects, the server 204 may be associated with a fleet operator and may be communicatively connected with the plurality of fleet vehicles. In this case, the server 204 may be configured to obtain part of or entire charging information associated with each fleet vehicle from the vehicles and/or a plurality of preferred chargers associated with the vehicle fleet (including the first charger 110 located at the depot 108). Examples of the charging information are already described above in conjunction with FIG. 1. The server 204 may be configured to transmit the obtained part of or entire charging information associated with each fleet vehicle to the system 104 at a predefined frequency. In some aspects, the system 104 may additionally obtain the charging information directly from each fleet vehicle and/or directly from the chargers.

The server 204 may be further configured to obtain weather condition information and road condition information associated with geographical areas where the plurality of fleet vehicles may be travelling, and transmit the weather condition information and the road condition information to the system 104 at a predefined frequency. In additional aspects, the server 204 may store information associated with a plurality of preferred chargers associated with the vehicle fleet (including the first charger 110), and transmit this "charger information" to the system 104 at a predefined frequency. The charger information may include, for example, charger geolocation, an amount of per-unit resources (e.g., fees or charges) required to be spent at each charger to charge the vehicles, and/or the like.

The network 206 illustrates an example communication infrastructure in which the connected devices discussed in various embodiments of this disclosure may communicate. The network 206 may be and/or include the Internet, a private network, public network or other configuration that operates using any one or more known communication protocols such as, for example, transmission control protocol/Internet protocol (TCP/IP), Bluetooth®, BLE, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

Although FIG. 2 depicts the system 104 being communicatively coupled with a single vehicle 102, the system 104 may be configured to communicatively couple with the plurality of fleet vehicles simultaneously. The vehicle 102 (and each fleet vehicle) may include a plurality of units including, but not limited to, a vehicle transceiver 208, a telematics unit 210, a vehicle control unit (VCU) 212, a vehicle infotainment system or Human-Machine Interface (HMI) 214, and/or the like, which may be communicatively coupled with each other. The vehicle transceiver 208 may be configured to receive/transmit data/information/signals from/to external systems and devices via the network 206. For example, the vehicle transceiver 208 may transmit or receive information/signals to/from the system 104, the user device 202, and/or the server 204. The vehicle transceiver 208 may be further configured to transmit/receive signals/information to/from the vehicle units described above.

The telematics unit 210 may be configured to determine a real-time vehicle geolocation, e.g., via Global Positioning System (GPS) signals. The VCU 212 may include a plurality of Electronic Control Units (ECUs, not shown) and/or a plurality of vehicle sensors (not shown) that may enable the VCU 212 to control vehicle operational aspects and implement one or more instruction sets received from the system 104, the server 204 and/or a vehicle processor (not shown). In further aspects, the VCU 212 may be configured to generate a signal/notification when the vehicle 102 connects to a charger to charge the vehicle 102, and determine an amount of energy/power transferred to the vehicle 102 while charging. The VCU 212 may also be configured to determine a real-time vehicle battery SoC level.

The HMI 214 may include a touchscreen interface portion, and may include voice recognition features, biometric identification capabilities that can identify users based on facial recognition, voice recognition, fingerprint identification, or other biological identification means. In other aspects, the HMI 214 may be further configured to receive user instructions via the touchscreen interface portion, and/or output or display notifications (including visual and/or audible alert notifications), navigation maps, recommendations, messages, etc. on the touchscreen interface portion.

The system 104 may include a plurality of units including, but not limited to, a system transceiver 216, a system processor 218 and a system memory 220 communicatively coupled with each other. The system transceiver 216 may be configured to receive/transmit information/signals from/to external systems or devices via the network 206. For example, the system transceiver 216 may receive/transmit information/signals from/to the vehicle 102 (and other fleet vehicles), the user device 202, and/or the server 204.

The system processor 218 may utilize the system memory 220 to store programs in code and/or to store data for performing operations in accordance with the present disclosure. The system memory 220 may be a non-transitory computer-readable storage medium or memory storing the program codes that may enable the system processor 218 to perform operation in accordance with the present disclosure. The system memory 220 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In some aspects, the system memory 220 may include a plurality of databases including, but not limited to, a charging information database 222, a weather and road condition information database 224, a charger information database 226 and a vehicle information database 228. The charging information database 222 may be configured to store the charging information that the system 104 may receive from the server 204, the plurality of fleet vehicles and/or the chargers. The weather and road condition information database 224 may be configured to store information associated with weather and road condition of a geographical area where each fleet vehicle may be travelling, from the server 204. The charger information database 226 may be configured to store the charger information that the system 104 may receive from the server 204 and/or directly from the chargers. As described above, the charger information may include, charger geolocation, an amount of per-unit resources (e.g., fees or charges) required to be spent at each charger to charge the vehicles, and/or the like. The vehicle information database 228 may be configured to store vehicle information (e.g., a real-time vehicle battery SoC level, a real-time vehicle geolocation, amount of energy/power transferred to the vehicle 102 while charging, etc.) that the system 104 may receive directly from the vehicle 102 or via the server 204.

In operation, the system transceiver 216 may receive the charging information, the charger information, the vehicle information, and the weather and road condition information when or before the vehicle 102 commences travel on a delivery route from the depot 108, and/or when the vehicle 102 may be travelling on the delivery route. Responsive to receiving the information described above, the system transceiver 216 may transmit the received information to respective memory databases for storage purpose.

Specifically, when or before the vehicle 102 commences travel on a delivery route from the depot 108, and/or when the vehicle 102 may be travelling on the delivery route, the system transceiver 216 may receive a first charger location associated with the first charger 110 (e.g., a charger located at the depot 108 or a preferred charger on the scheduled delivery route of the vehicle 102) and a second charger location associated with the second charger 112 (that may be a non-preferred charger) on the scheduled delivery route. The system transceiver 216 may receive this charger location information directly from respective chargers and/or from the server 204. The system transceiver 216 may transmit the charger location information to the charger information database 226 for storage purpose and/or to the system processor 218.

The system transceiver 216 may further receive a real-time vehicle battery SoC level associated with the vehicle 102 (e.g., via the VCU 212 and the vehicle transceiver 208) and a real-time vehicle geolocation associated with the vehicle 102 (e.g., via the telematics unit 210 and the vehicle transceiver 208), when the vehicle 102 commences travel on the delivery route and at a predefined frequency when the vehicle 102 may be travelling on the delivery route. The system transceiver 216 may transmit the received real-time vehicle battery SoC level and the vehicle geolocation information to the vehicle information database 228 for storage purpose and/or to the system processor 218.

The system transceiver 216 may further receive weather condition information associated with a geographical area including the first charger location and the second charger location (i.e., the geographical area associated with the delivery route of the vehicle 102), and the road condition information associated with a road (e.g., the road 106) between the first charger location and the second charger location, from the server 204. Responsive to receiving the weather condition information and the road condition information, the system transceiver 216 may transmit the information to the weather and road condition information database 224 for storage purpose and/or to the system processor 218.

When the vehicle 102 stops on the delivery route and the vehicle driver connects the vehicle 102 to a charger (e.g., the second charger 112) to charge the vehicle 102, the VCU 212 may generate a notification or a "first trigger signal" and transmit (via the vehicle transceiver 208) the generated first trigger signal to the system transceiver 216. The system transceiver 216 may receive the first trigger signal from the VCU 212 and transmit the first trigger signal to the system processor 218. In this manner, the system processor 218 may obtain the first trigger signal from the VCU 212 when the vehicle 102 may be connected to the second charger 112 to charge the vehicle 102.

Responsive to obtaining the first trigger signal, the system processor 218 may determine whether the second charger 112 may be a preferred charger associated with the vehicle fleet or a non-preferred charger, based on the charger information stored in the charger information database 226 and the second charger location. In some aspects, the charger information database 226 may store locations of a plurality of preferred chargers on the delivery route associated with the vehicle 102. The system processor 218 determine whether the second charger 112 may be a preferred or a non-preferred charger by comparing the second charger location with the locations of the plurality of preferred chargers stored in the charger information database 226. In some aspects, the system processor 218 may obtain the second charger location directly from the second charger 112, from the server 204 or by determining the real-time vehicle geolocation (as obtained via the telematics unit 210). Responsive to determining that the second charger location is not included in the locations associated with the plurality of preferred chargers based on the comparison, the system processor 218 may determine that the second charger 112 may be a non-preferred charger.

Responsive to determining that the second charger 112 may be a non-preferred charger, the system processor 218 may obtain the first charger location (i.e., the location associated with the first charger 110) from the charger information database 226, and the real-time vehicle battery SoC level (e.g., from the VCU 212). Responsive to obtaining the first charger location, the system processor 218 may determine a geo-distance between the first charger location and the second charger location. The system processor 218 may further obtain the weather condition information and the road condition information from the weather and road condition information database 224.

Responsive to determining the geo-distance and obtaining the weather and road condition information, the system processor 218 may estimate an expected battery SoC level that may be required by the vehicle 102 to travel from the second charger location to the first charger location based on the geo-distance, the weather condition information and/or the road condition information. Stated another way, the system processor 218 may determine an amount of battery power/energy that may be required by the vehicle 102 to travel from the location associated with the second charger 112 to the first charger 110 (which may be a depot charger or any of the preferred charger on the delivery route).

Figure 3:
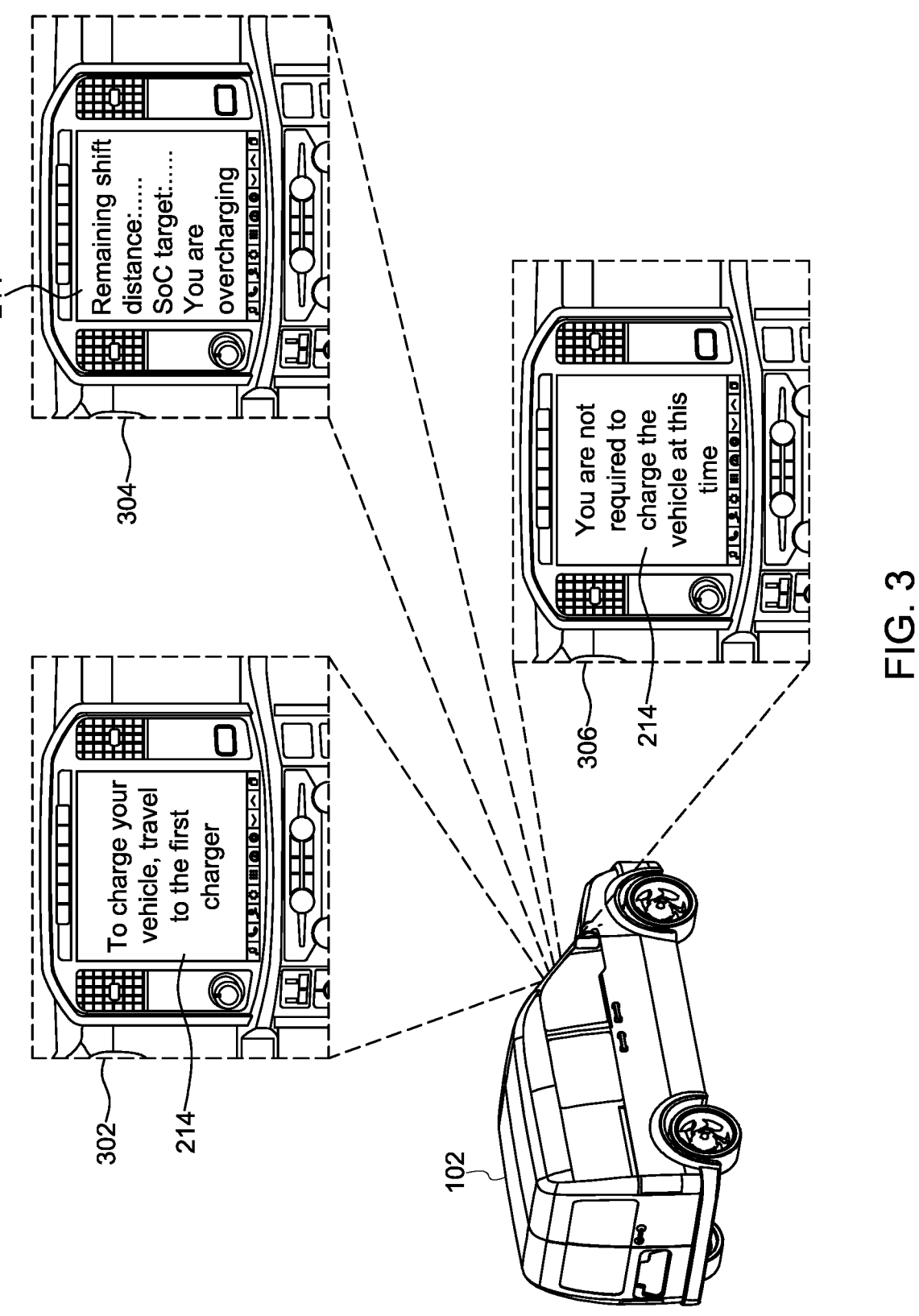
FIG. 3 depicts example notifications displayed on a vehicle infotainment system in accordance with the present disclosure.

Responsive to estimating the expected battery SoC level, the system processor 218 may compare the expected battery SoC level with the real-time vehicle battery SoC level (when the vehicle 102 may be located at the second charger location). The system processor 218 may output/transmit, via the system transceiver 216, a first notification to the HMI 214, the user device 202 and/or a fleet computing device/server 204 when the real-time vehicle battery SoC level may be greater than the expected battery SoC level. The first notification may indicate to the vehicle driver and/or the fleet operator that that the vehicle driver may not be required to charge at the second charger 112 (which may be a non-preferred charger), and may conveniently travel to the first charger location/first charger 110 (which may be a preferred charger) to charge the vehicle 102. Stated another way, the first notification may indicate to the vehicle driver and/or the fleet operator that the real-time/current vehicle battery SoC level may be enough for the vehicle 102 to conveniently reach to the first charger 110 without any charging at the second charger 112 (or any other charger on route to the first charger 110). An example view 302 of the first notification (stating "To charge your vehicle, travel to the first charger") being displayed on the HMI 214 is depicted in FIG. 3.

In some aspects, responsive to estimating the expected battery SoC level, the system processor 218 may additionally obtain an amount of first per-unit resources (e.g., fees) required to charge the vehicle 102 at the first charger 110 and an amount of second per-unit resources (e.g., fees) required to charge the vehicle 102 at the second charger 112. The first per-unit resources and the second per-unit resources may be part of the charging information that the system transceiver 216 (and hence the system processor 218) may receive/obtain from the server 204 or directly from the first and second chargers 110, 112. Responsive to obtaining the first per-unit resources and the second per-unit resources, the system processor 218 may compare the first per-unit resources and the second per-unit resources. In some aspects, the system processor 218 may output/transmit, via the system transceiver 216, the first notification when the second per-unit resources may be greater than the first per-unit resources. Stated another way, the system processor 218 may output/transmit the first notification to the HMI 214, the user device 202 and/or the fleet computing device/server 204 when the system processor 218 determines that more resources (e.g., fees) may be required to charge the vehicle 102 at the second charger 112 as compared to the first charger 110.

In some aspects, responsive to determining that the real-time vehicle battery SoC level may be less than the expected battery SoC level, the system processor 218 may not output the first notification. In this case, the system processor 218 may determine whether the vehicle driver may be overcharging the vehicle 102, when the vehicle 102 may be connected to the second charger 112. To determine whether the vehicle driver may be overcharging the vehicle 102, the system processor 218 may obtain an initial battery SoC level associated with the vehicle 102 when the vehicle 102 began travel on the delivery route from the depot 108 and the average historical (or expected) SoC usage on the delivery route for the vehicle 102. In some aspects, the system processor 218 may obtain the initial battery SoC level based on the real-time battery SoC level that the system processor

218 may have obtained when the vehicle 102 commenced the travel from the depot 108. Further, the system processor 218 may obtain the expected SoC usage on the delivery route for the vehicle 102 from the charging information database 222 that stores the charging information associated with each fleet vehicle.

The system processor 218 may further obtain an amount of energy transferred to the vehicle 102 from the second charger 112 when the vehicle 102 connects with the second charger 112 to charge the vehicle 102. In some aspects, the system processor 218 may obtain the amount of energy transferred to the vehicle 102 from the second charger 112, the VCU 212, or via the server 204.

Responsive to obtaining the initial battery SoC level, the expected SoC usage and the amount of transferred energy, the system processor 218 may calculate a sum of the initial battery SoC level and the amount of transferred energy. The system processor 218 may then determine a difference between the sum and the expected SoC usage. The system processor 218 may output/transmit, via the system transceiver 216, a second notification to the HMI 214, the user device 202 and/or the fleet computing device/server 204, when the system processor 218 determines that the sum may be greater than the expected SoC usage and the determined difference may be greater than a predefined first threshold (which may be, e.g., 15-20% of the expected SoC usage). The second notification may indicate to the vehicle driver and/or the fleet operator that the vehicle driver may be overcharging the vehicle 102. An example view 304 of the second notification (stating "You are overcharging") being displayed on the HMI 214 is depicted in FIG. 3. As shown in the view 304, the second notification may include further details such as "Remaining shift distance", "SoC target" (which may be a minimum target SoC level associated with the vehicle 102 when the vehicle 102 returns to the depot 108), etc., which may facilitate the vehicle driver to readily view statistics associated with the delivery route and hence enable the vehicle driver to stop overcharging. In this manner, the system processor 218 assists in preventing vehicle overcharging.

In additional aspects, the system processor 218 may be configured to determine whether charging of the vehicle 102 may even be required/necessary when the vehicle driver connects the vehicle 102 with the second charger 112. In this case, when the vehicle driver connects the vehicle 102 with the second charger 112, the system processor 218 may obtain the initial battery SoC level and the expected SoC usage, as described above. Responsive to obtaining the initial battery SoC level and the expected SoC usage, the system processor 218 may determine a difference between the initial battery SoC level and the expected SoC usage. The system processor 218 may output/transmit, via the system transceiver 216, a third notification to the HMI 214, the user device 202 and/or the fleet computing device/server 204, when the system processor 218 determines that the initial battery SoC level is greater than the expected SoC usage and the difference between the initial battery SoC level and the expected SoC usage is greater than a predefined second threshold (which may be, for example, equivalent to the "SoC target" described above). The third notification may indicate to the vehicle driver and/or the fleet operator that vehicle charging may not be required, and the vehicle 102 may conveniently finish the shift and travel back to the depot 108 without any charging. An example view 306 of the third notification (stating "You are not required to charge the vehicle at this time") being displayed on the HMI 214 is depicted in FIG. 3. In this manner, the system processor 218 may assist the vehicle driver in knowing when not to charge, thereby minimizing loss of productive hours and conserving energy.

The system processor 218 may be further configured to alert the fleet operator and/or the vehicle driver when the vehicle driver may be charging the vehicle 102 during off-hours or when the vehicle 102 may not be typically charged. In this case, the VCU 212 may generate a second trigger signal when the vehicle 102 may be connected, for example, to the first charger 110. The VCU 212 may transmit, via the vehicle transceiver 208, the second trigger signal to the system transceiver 216 (and hence to the system processor 218). In this manner, the system processor 218 may obtain the second trigger signal from the VCU 212 when the vehicle 102 connects to the first charger 110 to charge the vehicle 102.

Responsive to obtaining the second trigger signal, the system processor 218 may determine a current day and time from a system timer (not shown). The system processor 218 may further obtain/determine a typical time and day (or predetermined time and day) when the vehicle 102 charges at the first charger 110, based on the charging information associated with the vehicle 102. Responsive to determining the typical time and day, the system processor 218 may compare the current time and day with the typical time and day. The system processor 218 may output/transmit, via the system transceiver 216, a fourth notification to the HMI 214, the user device 202 and/or the fleet computing device/server 204, when the system processor 218 determines that the current time/day may be different from the typical time/day. For example, the system processor 218 may output the fourth notification when the vehicle driver may be charging the vehicle 102 on a Sunday at 9 AM, when typically the vehicle 102 is not charged on Sundays. The fourth notification may indicate to the fleet operator that the vehicle driver may be operating (or charging the vehicle 102) during off-hours. The fleet operator may use such a notification to train the vehicle driver.

Although the description above describes an aspect where the system processor 218 outputs/transmits the first, second, third and fourth notifications in real-time when the vehicle driver may be charging the vehicle 102 using a non-preferred charger, or overcharging the vehicle 102, charging the vehicle 102 when not required/necessary, or charging the vehicle 102 during off-hours, the present disclosure is not limited to the aspect of providing real-time notifications. In some aspects, the system processor 218 may additionally generate and provide daily, weekly, fortnightly, monthly, etc. summaries of charging behavior associated with each driver and/or fleet vehicle to the fleet computing device/server 204. The system processor 218 may generate the summaries of charging behavior based on data/information obtained from the fleet vehicles, respective chargers, the server 204, and/or the like. The fleet operator may view the summaries and identify drivers who may need training on effectively charging their vehicles, and/or identify vehicles that may be overbooked/over-utilized or vehicles that may require an upgrade, a replacement or a power bank.

An example charging behavior summary table 400 (or table 400) associated with a driver/vehicle (e.g., the vehicle 102) generated and provided by the system processor 218 to the server 204 is depicted in FIG. 4. The table 400 may include a first column 402 that may denote a day of a week. As an example, "0" in the first column 402 may denote Monday, "1" may denote Tuesday, and/or the like (days "5" and "6" may be weekends). The table 400 may further include a second column 404 that may denote an average initial SoC level on each day when the vehicle 102 left the depot 108. As depicted in the column 404, the vehicle 102 may not have been charged fully to 100% on days 2, 3 and 4. Such an information may be used by the fleet operator to better plan vehicle charging for each fleet vehicle at the depot 108, so that the vehicles may have 100% SoC when the respective vehicles leave the depot 108.

The table 400 may further include a third column 406 and a fourth column 408 that may denote an average historical SoC usage associated with the vehicle 102 for each day and a sigma value (or standard deviation) associated with the SoC usage associated with the vehicle 102 for each day, respectively. The system processor 218 or the fleet operator may estimate an expected SoC usage for the vehicle 102 for each day by adding values included in the third column 406 and 50%, 84%, 85%, 97%, or 98% (or any other percentage) of the values included in the fourth column 408. The system processor 218 or the fleet operator may use the expected SoC usage to determine percentage over-utilization of the vehicle 102 on each day over the 100% initial SoC level. An example of the over-utilization over 100% SoC level is included in column 410. The fleet operator may determine that the vehicle 102 may need a battery upgrade or a replacement, or may require a power bank when the values included in the column 410 are consistently (e.g., on each day) greater than a predefined threshold (e.g., 50 or 60%).

The table 400 may further include additional statistics/columns that may assist the fleet operator in determining the charging behavior associated with the vehicle driver/vehicle 102. For example, the table 400 may include a column 412 that may denote an average starting SoC level when the vehicle 102 may be charged at the second charger 112 (i.e., a non-preferred or a non-depot (ND) charger), a column 414 that may denote an average SoC or an amount of energy transferred from the second charger 112 to the vehicle 102, a column 416 that may denote an SoC or amount of energy that may be overcharged into the vehicle 102 (the overcharging SoC may factor-in 15-20% buffer over daily expected SoC usage/needs), and a column 418 that may denote an actual or a normalized loss of productive hours (or extended shift duration) due to overcharging.

The fleet operator may view the details included in the columns 412-418 to determine if the vehicle driver may be unnecessarily charging and/or overcharging the vehicle 102, which may be leading to loss of productivity. In additional aspects, the system processor 218 may use the information included in the columns 404-418 to calculate one or more scores associated with the vehicle driver/vehicle 102. The system processor 218 may calculate the scores by using known statistical models.

As an example, the system processor 218 may calculate an overcharge indicator score (as shown in column 420) that may denote a tendency of the vehicle driver to overcharge the vehicle 102. In an exemplary aspect, the overcharge indicator score may be calculated by using a mathematical expression $\{(\text{Total SoC charged/Total SoC Used})-1\}$. The system processor 218 may further calculate an overcharge amount score (as shown in column 422) that may be based on a normalized value of (Total SoC charged−Total SoC used). The system processor 218 may additionally calculate a range anxiety score (as shown in column 424) for the vehicle driver that may indicate a level of range anxiety experienced by the vehicle driver. In some aspects, the range anxiety score may be based on an amount of SoC charged by the vehicle driver and an SoC remaining when the vehicle 102 reaches back to the depot 108 at the end of the shift. The range anxiety score may be higher if the vehicle 102 typically reaches back at the depot 108 with a relatively high SoC level (e.g., higher than a predefined threshold). The fleet operator may identify training needs for the vehicle driver if the range anxiety score may be high.

The system processor 218 may further include in the table 400 a count of times (not shown) when the vehicle 102 may be charged for more than 100% SoC level and a count of times (not shown) the vehicle 102 may be charged by using the second charger 112. The system processor 218 may further calculate one or more additional scores, e.g., a score associated with inefficient charging by the vehicle driver (that may be same as or different from the overcharge indicator score), a score associated with an overcharge likelihood associated with the vehicle driver (that may be based on a count of times the vehicle 102 may be charged by using the second charger 112, the overcharge indicator score, the overcharge amount score, and/or the like), etc.

In addition to providing the table 400 (including the columns/scores described above) associated with the vehicle 102/vehicle driver, the system processor 218 may provide similar tables, columns, scores, etc. associated with each fleet vehicle (i.e., vehicle-level scores/data) and a fleet-level table/scores to the server 204. The fleet operator may view and compare the vehicle-level scores/data with the fleet-level scores/data to identify one or more vehicles/vehicle drivers that may require training and/or regular notifications to prevent overcharging or charging at non-preferred chargers.

Figure 5A:
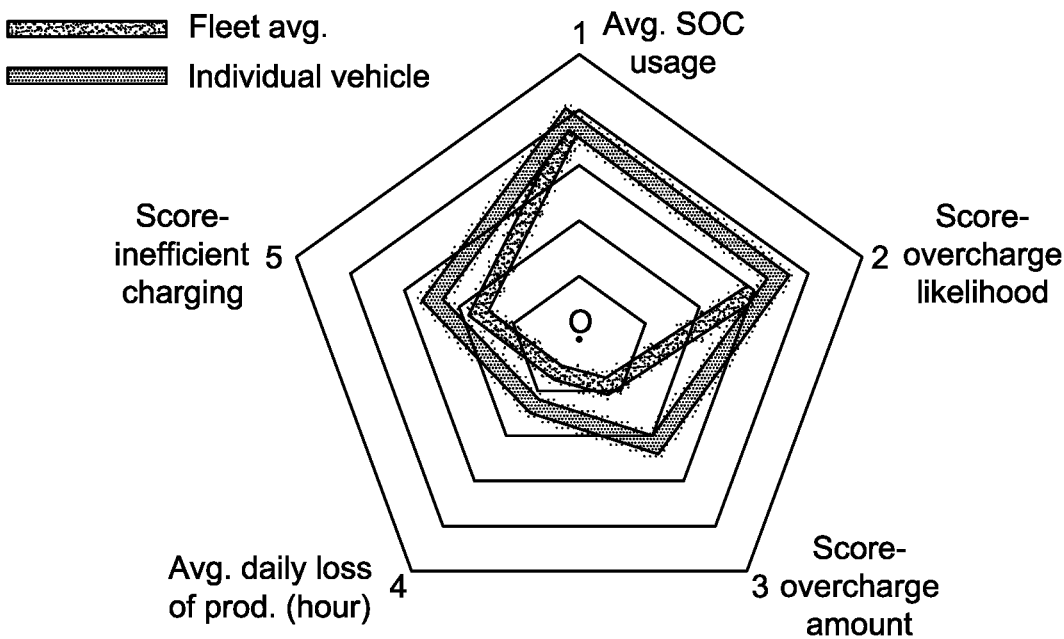
FIGS. 5A and 5B depict example snapshots of comparison between vehicle charging parameters and fleet average in accordance with the present disclosure.
Figure 5B:
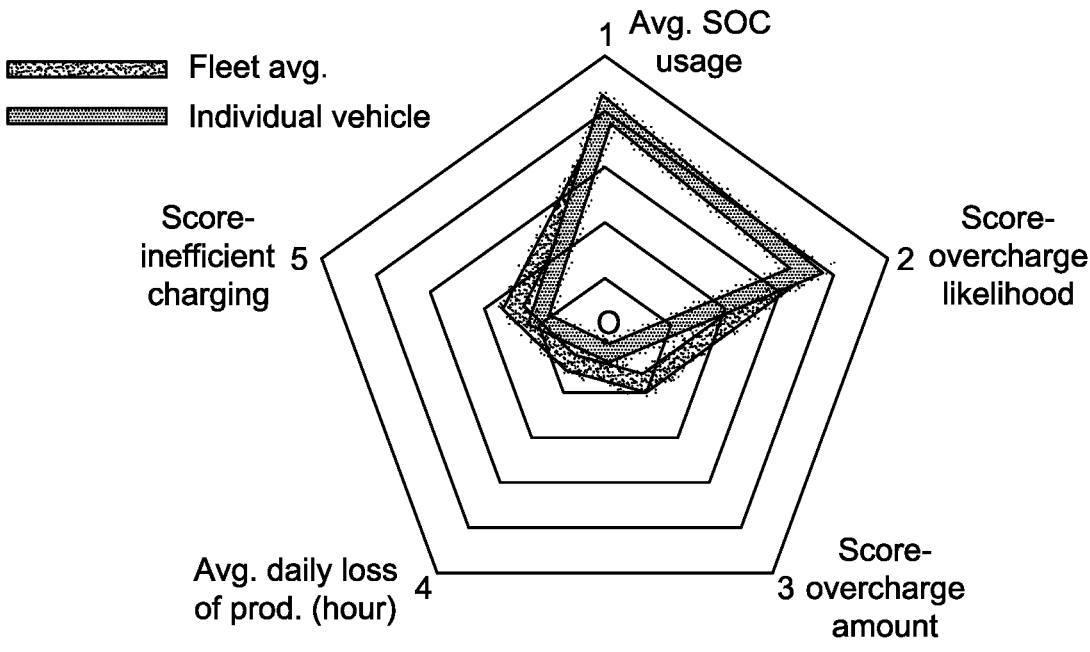

Example snapshots of comparisons between two vehicles (e.g., a Vehicle 1 and a Vehicle 2) and fleet-level scores/data is depicted in FIGS. 5A and 5B. Specifically, FIG. 5A depicts comparison of one or more data/scores associated with the Vehicle 1 with the corresponding fleet-level data/scores, and FIG. 5B depicts comparison of one or more data/scores associated with the Vehicle 2 with the corresponding fleet-level data/scores. Five types of data/scores are depicted in the comparison graphs included in FIGS. 5A and 5B, although the present disclosure is not limited to the depicted data/scores.

In an exemplary aspect, FIG. 5A depicts data/score for an average SoC usage (shown as "1" in FIG. 5A) for the Vehicle 1 and the fleet, an overcharge likelihood score (shown as "2" in FIG. 5A) for the Vehicle 1 and the fleet, an overcharge amount score (shown as "3" in FIG. 5A) for the Vehicle 1 and the fleet, an average loss of productivity in hours (shown as "4" in FIG. 5A) for the Vehicle 1 and the fleet, and an inefficient charging score (shown as "5" in FIG. 5A) for the Vehicle 1 and the fleet. In some aspects, a distance from a center "O" of the pentagon depicts the corresponding data/score.

In a similar manner, FIG. 5B depicts data/score for an average SoC usage (shown as "1" in FIG. 5B) for the Vehicle 2 and the fleet, an overcharge likelihood score (shown as "2" in FIG. 5B) for the Vehicle 2 and the fleet, an overcharge amount score (shown as "3" in FIG. 5B) for the Vehicle 2 and the fleet, an average loss of productivity in hours (shown as "4" in FIG. 5B) for the Vehicle 2 and the fleet, and an inefficient charging score (shown as "5" in FIG. 5B) for the Vehicle 2 and the fleet.

In an exemplary aspect, a vehicle may have a "better" charging behavior than the fleet if the pentagon associated with the vehicle may be located within the pentagon associated with the fleet, as shown in FIG. 5B. On the other hand, a vehicle or the corresponding vehicle driver may require training if the pentagon associated with the vehicle may be located outside of the pentagon associated with the fleet, as shown in FIG. 5A. Stated another way, if the vehicle's scores or data associated with overcharging, inefficient charging, loss of productive hours, etc. may be greater than the corresponding fleet scores/data, then the vehicle driver may require training, e.g., on best practices of vehicle charging.

In the example comparison snapshots depicted in FIGS. 5A and 5B, the vehicle driver associated with the Vehicle 1 (e.g., the vehicle 102) may require training. Responsive to determining that the vehicle driver associated with the vehicle 102 may require training, the fleet operator may cause the system 104 to perform one or more actions to prevent the vehicle driver from overcharging and/or charging from non-preferred chargers. For example, in this case, when the vehicle driver associated with the vehicle 102 may be driving on the delivery route, the system processor 218 may output/transmit, via the system transceiver 216, one or more regular notifications to the HMI 214 reminding the vehicle driver to prevent overcharging or charging the vehicle 102 when it may not be required/necessary. The system processor 218 may further cause the HMI 214 to display remaining shift distance, SoC target, SoC left, etc., so that the vehicle driver may not overcharge the vehicle 102 and/or charge the vehicle 102 only when necessary. The system processor 218 may additionally provide the real-time notifications (e.g., the first, second, third, fourth notifications) described above to enhance vehicle charging behavior associated with the vehicle driver.

A person ordinarily skilled in the art may appreciate from the description above that enhancing charging behavior associated with the vehicle driver may result in potential savings for the fleet, increase in fleet operational efficiency, and also assist in conserving energy. In addition, by analyzing the fleet-level data/scores and the vehicle-level data/scores, the fleet operator may identify one or more vehicles that may need a battery upgrade or a replacement (e.g., the vehicles that may constantly require charging while travelling on the delivery route), and/or a power bank. The fleet operator may also appropriately size the power bank based on the fleet-level data/scores and the vehicle-level data/scores. For example, the fleet operator may size the power bank based on mean or sigma values of daily SoC usage, normal distribution of SoC usage, amount of resources (e.g., fees) associated with vehicle charging, loss of productive hours, and/or the like. The fleet operator may further take a number of decisions based on the fleet-level data/scores and the vehicle-level data/scores, e.g., whether to procure new vehicles for the fleet or replace batteries in existing vehicles, whether to perform load balancing to ease load on over-utilized vehicles, whether to procure new power banks (and their respective sizes), whether to include more changers (e.g., the second charger 112) to the list of preferred chargers for the fleet, and/or the like.

Figure 6:
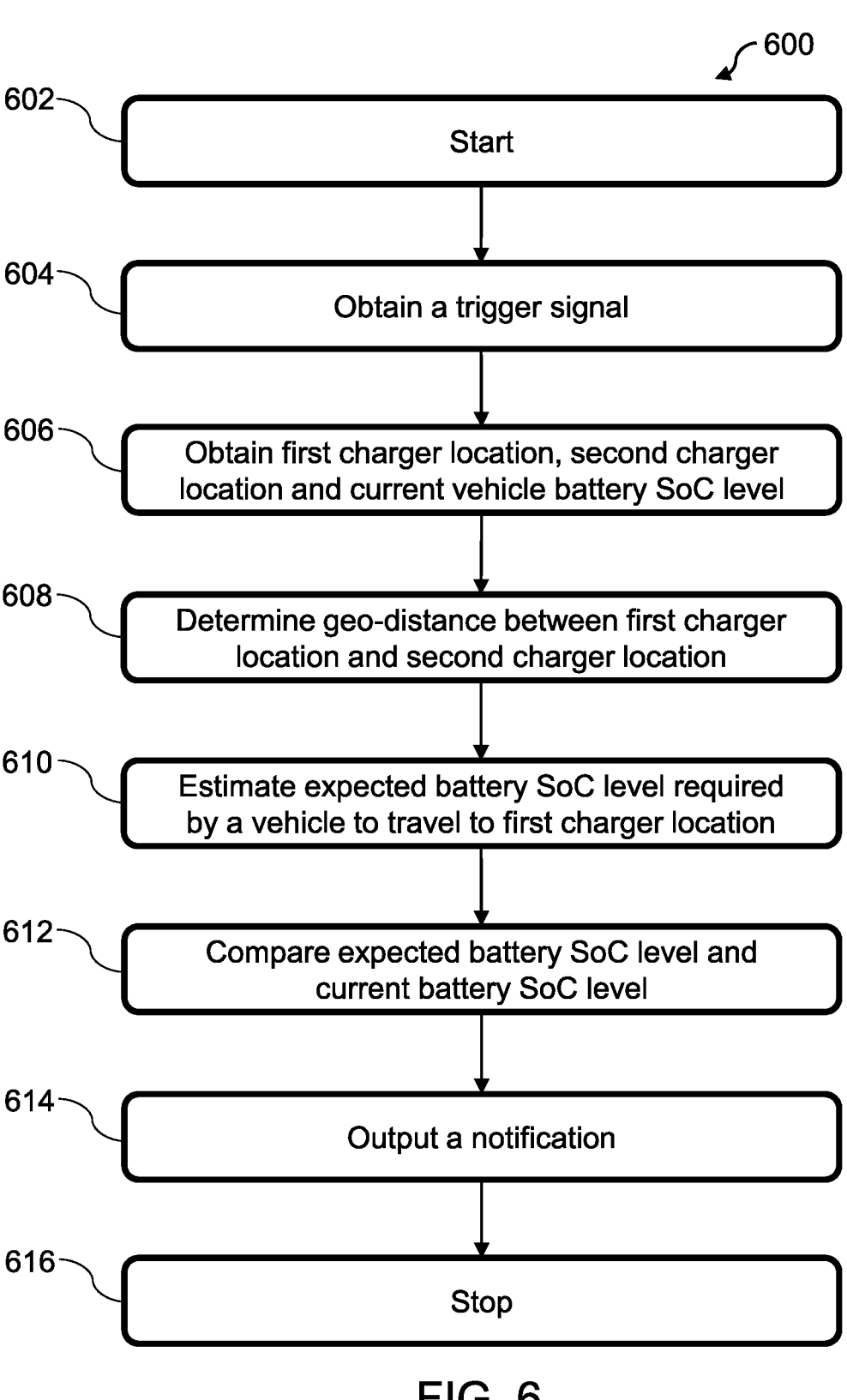
FIG. 6 depicts a flow diagram of an example fleet management method in accordance with the present disclosure.

FIG. 6 depicts a flow diagram of an example fleet management method 600 in accordance with the present disclosure. FIG. 6 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 600 starts at step 602. At step 604, the method 600 may include obtaining, by the system processor 218, the first trigger signal from the VCU 212. At step 606, the method 600 may include obtaining, by the system processor 218, the first charger location associated with the first charger 110, the second charger location associated with the second charger 112 and a real-time or current vehicle battery SoC level associated with the vehicle 102, responsive to obtaining the first trigger signal.

At step 608, the method 600 may include determining, by the system processor 218, the geo-distance between the first charger location and the second charger location. At step 610, the method 600 may include estimating, by the system processor 218, the expected battery SoC level required by the vehicle 102 to travel from the second charger location to the first charger location based on the determined geo-distance (and weather and road condition information, as described above).

At step 612, the method 600 may include comparing, by the system processor 218, the expected battery SoC level and the current battery SoC level. At step 614, the method 600 may include outputting the first notification when the current battery SoC level may be greater than the expected battery SoC level, as described above.

The method 600 ends at step 616.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system comprising:

a transceiver configured to receive:

a first charger location associated with a first charger and a second charger location associated with a second charger; and a current battery State of Charge (SoC) level associated with a vehicle; and a processor communicatively coupled with the transceiver, wherein the processor is configured to:

obtain a first trigger signal;

obtain the first charger location, the second charger location and the current battery SoC level from the transceiver responsive to obtaining the first trigger signal;

determine a geo-distance between the first charger location and the second charger location;

estimate an expected battery SoC level required by the vehicle to travel from the first charger location to the second charger location based on the geo-distance;

compare the expected battery SoC level and the current battery SoC level; and determine a first set of charging indicators associated with a fleet of vehicles;

determine a second set of charging indicators associated with a driver of the vehicle;

when the current battery SoC level is greater than the expected battery SoC level:

determine, based at least in part on a comparison of the first set of charging indicators and the second set of charging indicators, a tendency of the user to overcharge the vehicle; and responsive to the tendency indicating an abnormally high tendency of the driver to overcharge the vehicle:

prevent the first charger from charging the vehicle; and output a notification when the current battery SoC level is greater than the expected battery SoC level.

2. The system of claim 1, wherein the processor obtains the first trigger signal when the vehicle connects with the first charger to charge the vehicle.

3. The system of claim 1, wherein the transceiver is further configured to receive weather condition information associated with a geographical area comprising the first charger location and the second charger location, and road condition information associated with a road between the first charger location and the second charger location.

4. The system of claim 3, wherein the processor estimates the expected battery SoC level based on the weather condition information and the road condition information.

5. The system of claim 1, wherein the transceiver is further configured to receive an amount of first resources required to charge the vehicle using the first charger and an amount of second resources required to charge the vehicle using the second charger.

6. The system of claim 5, wherein the processor outputs the notification when the amount of first resources is greater than the amount of second resources.

7. The system of claim 1, wherein the processor outputs the notification to a user device, a vehicle Human-Machine Interface (HMI) or a server.

8. The system of claim 1, wherein the processor is further configured to:

obtain a second trigger signal;

determine a current time responsive to obtaining the second trigger signal;

compare the current time with a predetermined time; and output the notification when the current time is different from the predetermined time.

9. The system of claim 8, wherein the processor obtains the second trigger signal when the vehicle connects with the second charger to charge the vehicle.

10. The system of claim 1, wherein the transceiver is further configured to receive:

an initial battery SoC level associated with the vehicle when the vehicle begins a delivery route;

an average expected SoC usage on the delivery route; and an amount of energy transferred to the vehicle using the first charger when the vehicle connects with the first charger to charge the vehicle.

11. The system of claim 10, wherein the processor is further configured to:

calculate a sum of the amount of energy and the initial battery SoC level;

determine a first difference between the sum and the average expected SoC usage; and output the notification when the first difference is greater than a first predefined threshold.

12. The system of claim 10, wherein the processor is further configured to:

determine a second difference between the initial battery SoC level and the average expected SoC usage; and output the notification when the second difference is greater than a second predefined threshold.

13. A method comprising:

obtaining, by a processor, a first trigger signal;

obtaining, by the processor, a first charger location associated with a first charger, a second charger location associated with a second charger and a current battery State of Charge (SoC) level associated with a vehicle responsive to obtaining the first trigger signal;

determining, by the processor, a geo-distance between the first charger location and the second charger location;

estimating, by the processor, an expected battery SoC level required by the vehicle to travel from the first charger location to the second charger location based on the geo-distance;

comparing, by the processor, the expected battery SoC level and the current battery SoC level; and determining a first set of charging indicators associated with a fleet of vehicles;

determining a second set of charging indicators associated with a driver of the vehicle;

when the current battery SoC level is greater than the expected battery SoC level:

determining, based at least in part on a comparison of the first set of charging indicators and the second set of charging indicators, a tendency of the user to overcharge the vehicle; and responsive to the tendency indicating an abnormally high tendency of the driver to overcharge the vehicle:

preventing the first charger from charging the vehicle; and outputting, by the processor, a notification when the current battery SoC level is greater than the expected battery SoC level.

14. The method of claim 13, wherein obtaining the first trigger signal comprises obtaining the first trigger signal when the vehicle connects with the first charger to charge the vehicle.

15. The method of claim 13 further comprising obtaining weather condition information associated with a geographical area comprising the first charger location and the second charger location, and road condition information associated with a road between the first charger location and the second charger location.

16. The method of claim 15, wherein estimating the expected battery SoC level comprises estimating the expected battery SoC level based on the weather condition information and the road condition information.

17. The method of claim 13 further comprising:

obtaining a second trigger signal;

determining a current time responsive to obtaining the second trigger signal;

comparing the current time with a predetermined time; and outputting the notification when the current time is different from the predetermined time.

18. The method of claim 17, wherein obtaining the second trigger signal comprises obtaining the second trigger signal when the vehicle connects with the second charger to charge the vehicle.

19. The method of claim 13, wherein outputting the notification comprises outputting the notification to a user device, a vehicle Human-Machine Interface (HMI) or a server.

20. A non-transitory computer-readable storage medium having instructions stored thereupon which, when executed by a processor, cause the processor to:

obtain a trigger signal;

obtain a first charger location associated with a first charger, a second charger location associated with a second charger and a current battery State of Charge (SoC) level associated with a vehicle responsive to obtaining the trigger signal;

determine a geo-distance between the first charger location and the second charger location;

estimate an expected battery SoC level required by the vehicle to travel from the first charger location to the second charger location based on the geo-distance;

compare the expected battery SoC level and the current battery SoC level; and determine a first set of charging indicators associated with a fleet of vehicles;

determine a second set of charging indicators associated with a driver of the vehicle;

when the current battery SoC level is greater than the expected battery SoC level:

determine, based at least in part on a comparison of the first set of charging indicators and the second set of charging indicators, a tendency of the user to overcharge the vehicle; and responsive to the tendency indicating an abnormally high tendency of the driver to overcharge the vehicle:

prevent the first charger from charging the vehicle; and output a notification when the current battery SoC level is greater than the expected battery SoC level.

* * * * *